United States Patent
Chen et al.

(10) Patent No.: US 9,846,602 B2
(45) Date of Patent: Dec. 19, 2017

(54) MIGRATION OF A LOGICAL PARTITION OR VIRTUAL MACHINE WITH INACTIVE INPUT/OUTPUT HOSTING SERVER

(71) Applicant: International Business Machines Corporation, Armonk, NY (US)

(72) Inventors: Ping Chen, Austin, TX (US); Hariganesh Muralidharan, Bangalore (IN); Anu P. Shaw, Hyderabad (IN); Vasu Vallabhaneni, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/043,195

(22) Filed: Feb. 12, 2016

(65) Prior Publication Data
US 2017/0235612 A1   Aug. 17, 2017

(51) Int. Cl.
*G06F 9/455* (2006.01)
*G06F 9/50* (2006.01)

(52) U.S. Cl.
CPC ........ *G06F 9/5077* (2013.01); *G06F 9/45558* (2013.01); *G06F 2009/4557* (2013.01); *G06F 2009/45579* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 7,257,811 B2* | 8/2007 | Hunt | ..................... | G06F 9/4856 707/999.2 |
| 7,849,347 B2 | 12/2010 | Armstrong et al. | | |
| 7,853,960 B1* | 12/2010 | Agesen | ................. | G06F 9/4825 718/1 |
| 8,830,870 B2 | 9/2014 | Cardona et al. | | |
| 9,038,067 B2* | 5/2015 | Miki | ..................... | G06F 9/5077 709/223 |
| 9,110,705 B2* | 8/2015 | Cawlfield | ........... | G06F 9/45558 |
| 9,154,366 B1* | 10/2015 | Martin | .............. | H04L 29/08072 |

(Continued)

FOREIGN PATENT DOCUMENTS

EP    2834734 A4    1/2016

OTHER PUBLICATIONS

Anonymous, "A method to detect and handle performance deterioration in virtual machines," IP.com electronic Publication, Aug. 4, 2015, IPCOM000242683D, pp. 1-4.

(Continued)

*Primary Examiner* — Mehran Kamran
(74) *Attorney, Agent, or Firm* — Patterson + Sheridan, LLP

(57) ABSTRACT

Embodiments disclose techniques for migrating a logical partition from a source computing system with an inactive I/O server to another target computing system. In one embodiment, a computing system collects and stores the resource configuration of the logical partition, upon detecting a change in a resource configuration of a logical partition on the source computing system. Once the computing system detects that a I/O server on the source computing system is inactive for a migration of the logical partition, the computing system uses the collected resource configuration to configure the logical partition on the target computing system.

13 Claims, 9 Drawing Sheets

(56) References Cited

U.S. PATENT DOCUMENTS

| | | | | |
|---|---|---|---|---|
| 2006/0036877 A1* | 2/2006 | Anderson | G06F 1/3209 | 713/300 |
| 2006/0064523 A1* | 3/2006 | Moriki | G06F 9/45558 | 710/62 |
| 2008/0126579 A1* | 5/2008 | Corneli | G06F 9/5088 | 710/5 |
| 2009/0187899 A1* | 7/2009 | Mani | G06F 8/65 | 717/168 |
| 2010/0122124 A1* | 5/2010 | Chen | G06F 9/45558 | 714/57 |
| 2010/0229181 A1* | 9/2010 | Ahuja | G06F 9/4856 | 718/107 |
| 2011/0131576 A1* | 6/2011 | Ikegaya | G06F 9/455 | 718/1 |
| 2011/0154128 A1* | 6/2011 | Rajkumari | G06F 11/0709 | 714/48 |
| 2011/0161491 A1* | 6/2011 | Sekiguchi | G06F 9/4856 | 709/224 |
| 2011/0321041 A1* | 12/2011 | Bhat | G06F 9/4856 | 718/1 |
| 2012/0066543 A1* | 3/2012 | Pafumi | G06F 11/2005 | 714/4.11 |
| 2012/0066678 A1* | 3/2012 | Pafumi | G06F 9/45558 | 718/1 |
| 2012/0084071 A1* | 4/2012 | Cyr | G06F 11/0793 | 703/25 |
| 2012/0150816 A1* | 6/2012 | Pafumi | G06F 11/1441 | 707/679 |
| 2012/0158997 A1* | 6/2012 | Hsu | H04L 29/12028 | 709/242 |
| 2012/0179771 A1* | 7/2012 | Ganti | G06F 11/1425 | 709/213 |
| 2012/0287936 A1* | 11/2012 | Biswas | H04L 49/70 | 370/395.3 |
| 2012/0303594 A1* | 11/2012 | Mewhinney | G06F 11/1482 | 707/692 |
| 2013/0031341 A1* | 1/2013 | Ganti | G06F 9/4401 | 713/2 |
| 2013/0086298 A1* | 4/2013 | Alanis | G06F 9/4856 | 711/6 |
| 2013/0227559 A1* | 8/2013 | Tsirkin | G06F 9/45558 | 718/1 |
| 2014/0130044 A1* | 5/2014 | Zhang | G06F 9/45533 | 718/1 |
| 2014/0136715 A1* | 5/2014 | Hegde | G06F 9/4856 | 709/226 |
| 2014/0201736 A1* | 7/2014 | Mizrahi | G06F 9/45558 | 718/1 |
| 2015/0169351 A1* | 6/2015 | Song | H04L 12/4641 | 718/1 |
| 2016/0004551 A1* | 1/2016 | Terayama | G06F 9/5011 | 718/1 |
| 2016/0378547 A1* | 12/2016 | Brouwer | G06F 9/4856 | 718/1 |

OTHER PUBLICATIONS

Clark et al., "Live migration of virtual machines," Proc. 2nd Symp. Networked Systems Design and Implementation, 2005, pp. 273-286.

International Business Machines Corporation, "IBM Elastic Storage Server: Capturing a partition configuration," downloaded from <http://www-01.ibm.com/support/knowledgecenter/P8ESS/p8efc/p8efc_copying_config_as_partition_template.htm> on Feb. 8, 2016, 1 page.

Jones, Merwyn, "Introduction to the System z Hardware Management Console," IBM.com/redbooks, International Technical Support Organization, Feb. 2010, downloaded from <http://www.redbooks.ibm.com/redbooks/pdfs/sg247748.pdf> on Feb. 8, 2016, 372 pages.

Grace Period Disclosure: International Business Machines Corporation, "Managing System Properties," IBM Knowledge Center, downloaded from <https://www-01.ibm.com/support/knowledgecenter/HW4L4/p8efd/p8efd_managing_powervm_props.htm> on Feb. 10, 2016, 3 pages.

Grace Period Disclosure: International Business Machines Corporation, "Live Partition Mobility (LPM) improvements in PowerVM 2.24," IBM developerWorks, downloaded from <https://www.ibm.com/developerworks/community/wikis/home?lang=en#!/wiki/Power%20Systems/page/Live%20Partition%20Mobility%20%28LPM%29%20improvements%20in%20PowerVM%202.2.4> on Feb. 10, 2016, 3 pages.

* cited by examiner

MIGRATION OF A LOGICAL PARTITION OR VIRTUAL MACHINE WITH INACTIVE INPUT/OUTPUT HOSTING SERVER

STATEMENT REGARDING PRIOR DISCLOSURES BY THE INVENTOR OR A JOINT INVENTOR

The following disclosures are submitted under 35 U.S.C. 102(b)(1)(A): "Managing system properties," *International Business Machines*, Dec. 17, 2015, https://www-01.ibm.com/support/knowledgecenter/#!/HW4L4/p8efd/p8efd_managing_powervm_props.htm; and "Live Partition Mobility (LPM) improvements in PowerVM 2.2.4," *International Business Machines*, Oct. 19, 2015, https://www.ibm.com/developerworks/community/wikis/home?lang=en#!/wiki/Power Systems/page/Live Partition Mobility %28LPM %29 improvements in PowerVM 2.2.4.

BACKGROUND

The present disclosure generally relates to migrating logical partitions (or virtual machines), and more specifically, to techniques that allow for migrating logical partitions with an inactive input/output (I/O) server on a host computing system.

Administrators often logically partition the resources of computing systems through virtualization. These resources can include processors, memory, I/O devices, storage, etc. A firmware layer (e.g. a hypervisor) is used to expose virtualized computing hardware to different logical partitions (or virtual machines). Each logical partition can run a different operating system (OS). The hypervisor can provide each OS with a set of virtualized computing hardware. Referring in particular to I/O, a computing system may be provided with a special logical partition for I/O virtualization, referred to herein as a virtual I/O server (VIOS). A VIOS is generally configured to provide virtual I/O resources to the logical partitions of a computing system and enable shared access (by the logical partitions) to physical storage resources, e.g., disks, tape, optical media, etc.

Further, administrators, in some cases, may initiate a mobility event for a logical partition(s), which can include migration of the logical partition(s) from one source (host) computing system to another target computing system. Such a mobility event can occur during times of maintenance, for load-balancing, failure management, etc. One type of a migration process is an inactive migration, in which the logical partition from the source computing system is first powered off and then moved to the target computing system. Once moved, the logical partition can be powered on and activated. Another type of a migration process is an active migration, in which the migration of the logical partition is performed while service is provided and without disrupting user activities. In other words, the running logical partition (including its operating system and running applications) is moved from the source computing system to the target computing system without any shutdown or disruption of the operation of the running logical partition.

Typically, the migration of a logical partition or virtual machine from one (source) computing system to another (target) computing system involves frequent interaction with the VIOS partition on the source computing system. Thus, in cases where the source VIOS is inactive (e.g., due to errors or other issues), the migration of the logical partition from the source to the target computing system may not be possible until the source VIOS is once again activated. The process of activating VIOS partitions, however, can cause significant downtime in the migration process. For example, the process of activating the VIOS partition can involve powering off the source computing system to repair hardware issues before activating the VIOS partition. Activating the VIOS partition in this manner, however, can cause downtime for the logical partitions/applications (used by a user) and thus can affect the transparency (e.g., from the perspective of the user) of active migrations of logical partitions.

SUMMARY

One embodiment presented herein describes a method for performing a migration of a logical partition. The method generally includes upon detecting a change in a resource configuration of a logical partition on a first computing system, collecting the resource configuration of the logical partition. The resource configuration includes information related to one or more virtual resources allocated to the logical partition. The method also includes, upon detecting that an input/output (I/O) server on the first computing system is inactive for the migration of the logical partition, using the collected resource configuration to configure the logical partition on a second computing system.

Other embodiments include, without limitation, a computer program product that includes a non-transitory storage medium having computer-readable program code that enables a processing unit to implement one or more aspects of the disclosed methods as well as a system having a processor, memory, and application programs configured to implement one or more of the disclosed methods.

DETAILED DESCRIPTION

Figure 1:
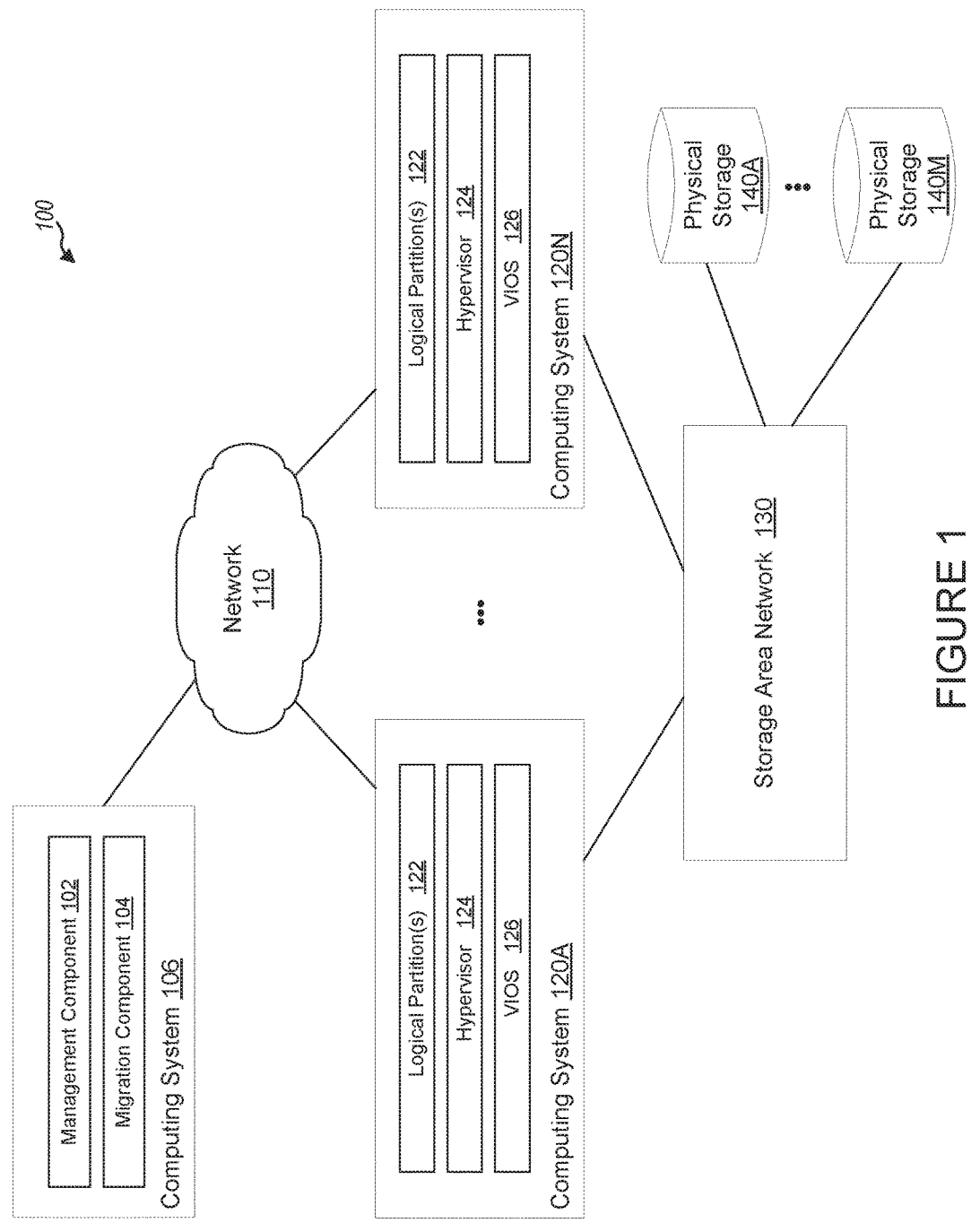
FIG. 1 illustrates an example computing environment in which logical partitions(s) may migrate from one computing system with an inactive IO hosting server to another computing system, according to one embodiment.

Embodiments presented herein disclose techniques that enable the migration of a logical partition with an inactive VIOS server on the source computing system. Embodiments presented herein also disclose techniques for preventing data corruption and/or data exposure in the event a migration occurs while the source VIOS is inactive. As such, the techniques presented herein provide improved performance (e.g., a significant reduction, or avoidance, in the potential downtime of a logical partition, increased reliability, availability, and serviceability (RAS), etc.) compared to traditional migration processes where a migration of logical partition cannot occur unless the source VIOS is active.

In general, a computing system such as a hardware management console (HMC) is responsible for migrating logical partition(s) or virtual machines. In traditional migration processes, the HMC typically locks the virtual adapter(s) on the source VIOS partition, and collects the logical partition's resource configuration. Such resource configuration generally includes information regarding how the logical partition is connected to the physical storage (e.g., mapping information from virtual adapters to physical storage, such as disk). The HMC uses the resource configuration information to configure the logical partition on the target computing system. Once the migration is performed, the HMC removes the resource configuration information from the source VIOS partition. However, in situations where the source VIOS partition is inactive (e.g., due to hardware errors, etc.), the HMC cannot migrate logical partitions, in part, due to the HMC being unable to lock the virtual adapter(s), collect the logical partition's resource configuration information, and/or clean up the resource configuration information from the source VIOS.

In these situations, traditional migration techniques typically attempt to activate the source VIOS partitions and, once activated, query the source VIOS partition for the information in order to start and/or resume the migration process. The process of activating a VIOS partition, however, can be very time-consuming. Further, in some cases, waiting to activate a VIOS partition can block the migration of a logical partition. For example, if the VIOS partition is inactive due to an error (e.g., hardware issues, etc.), and requires maintenance (e.g., by an administrator) to fix the error, the logical partition cannot be moved until the error affecting the VIOS partition is fixed. In some cases, fixing the error might involve first powering off the host to repair the hardware issues before the VIOS can be activated. As a result, the logical partition can experience increased downtime, which is undesirable.

As described in more detail below, the techniques presented herein allow a migration component to migrate a logical partition (or virtual machine) from a source computing system with an inactive VIOS partition to a target computing system. In one embodiment, the migration component pre-collects the logical partition's resource configuration (regarding the mapping from virtual adapter(s) to storage) from the source VIOS whenever the migration component detects a configuration change. For example, in some cases, the migration component may trigger a data collection once the migration component detects a configuration change related to the virtual adapter(s) (e.g., a virtual adapter(s) is added and/or removed from the logical partition). In some cases, the migration component may trigger a data collection once the migration component detects a configuration change related to storage devices (e.g., a storage device is added and/or removed from the logical partition). Once collected, the migration component stores the pre-collected information in the HMC.

In one embodiment, the migration component is also configured to monitor the status of the stored information and update the information if the migration component determines the information is out of date. For example, as described in more detail below, the migration component can provide a status and/or timestamp for the collected information, which the migration component can use to determine whether to trigger a data collection in order to update the collected information.

Once the migration component detects that the source VIOS is inactive for a migration procedure, the migration component uses the stored pre-collected information to configure the logical partition on the target computing system. In one embodiment, once the migration component detects that the source VIOS is activated, the migration component can clean up (remove) the adapter/mapping information from the source VIOS. Doing so prevents data corruption or exposure of the disk/storage to another logical partition (on the source computing system), for example, in situations where another adapter is defined in the same slot (using the same slot identifier) as the previous (removed) adapter.

Advantageously, the techniques presented herein allow a management console, via a migration component, to migrate a logical partition(s) from a source computing system to a target computing system even in cases where the VIOS on the source computing system is inactive. Thus, relative to traditional migration techniques, the techniques presented herein can substantially reduce (or even eliminate) the down time of a logical partition in situations where the I/O hosting server is inactive.

FIG. 1 illustrates an example computing environment 100, in which the techniques presented herein may be practiced, according to one embodiment. As shown, the computing environment 100 includes a computing system 106 connected via the network 110 to one or more computing systems 120A-120N. In general, the network 110 may be a wide area network (WAN), local area network (LAN), wireless LAN (WLAN), etc. In one embodiment, the network 110 is Ethernet. In one embodiment, each one of the computing systems 106 and 120A-N can be any kind of physical computing system having a network interface, such as a desktop computer, laptop computer, mobile device, tablet computer, server computing system, and the like. Each computing system 120A-N is also connected via the storage area network (SAN) 130 to one or more physical storage 140A-M. Examples of physical storage 140A-M include physical disks, external LUNs, tape drives, optical storage devices, tape storage devices, and the like.

Each computing system 120A-N includes one or more logical partitions (LPARs) 122, a hypervisor 124, and a VIOS partition 126. Each computing system 120 may spawn, using the hypervisor 124, a number of LPARs 122 that can belong to a number of independent entities (e.g., enterprises, organizations, individual users, etc.). The hypervisor 124 is software and/or hardware that manages and executes the LPARs 122 (also referred to as virtual machines or VMs) in the computing system 120. The hypervisor 124 is generally an intermediary between the LPARs 122 and the hardware in the computing system 120. For example, the hypervisor 124 can manage physical resource allocation and access physical resources (e.g., such as processors, I/O, memory, etc.) on behalf of a given LPAR 122.

Each LPAR 122 hosted in a given computing system 120 can run an independent operating system in order to execute one or more applications (or processes). Examples of operating systems include versions of the UNIX operating system (such as the AIX operating system), versions of the Microsoft Windows operating system, and distributions of the Linux operating system. (UNIX is a registered trademark of The Open Group in the United States and other countries, or both. Linux is a registered trademark of Linus Torvalds in the United States, other countries, or both). More generally, any operating system supporting the functions disclosed herein may be used.

The VIOS 126 is a partition that is generally configured to provide virtualized storage and/or network adapters to LPARs 122 in the computing system 120. For example, the VIOS 126 can allocate virtual I/O resources (e.g., virtual ports, virtual adapters, etc.) to LPARs 122 that the LPARs 122 can use to access the physical storage resources (e.g., physical storage 140A-M). Examples of virtual I/O adapters include virtual small computer systems interface (SCSI) adapters, virtual Ethernet adapters, virtual fibre channel adapters, virtual console adapters, etc. The VIOS 126 includes configuration information that specifies how the LPARs 122 are connected to the physical storage 140A-M. For example, such configuration information may include information regarding the mapping of the virtual adapters to the physical adapters and physical storage 140A-140M.

The computing system 106 is generally configured to provide management functions for one or more of the computing systems 120A-120N. In one embodiment, the computing system 106 is an example of a management console that can be used to configure and/or manage the resources within the computing systems 120A-120N. One example of a management console is the Hardware Management Console (HMC) by International Business Machines®. The computing system 106 can use the management component 102 to configure and manage the physical and/or virtual resources in the computing systems 120A-N, monitor the operation of the resources, perform dynamic partitioning of the resources, activate and manage capacity on demand resources, assign addresses to the resources, and the like. The management component 102 can interact with the VIOS 126 and/or the hypervisor 124 to manage the physical and/or virtual resources. In one embodiment, the management component 102 provides an interface (e.g., a graphical user interface (GUI)) that allows a user (or administrator) to configure and/or manage resources within the computing systems 120. In one embodiment, an administrator can interact with the computing system 106 remotely via the network 110 from another computing system (not shown).

As mentioned above, in some cases, an administrator may initiate a mobility event to migrate one or more logical partitions 122 from one computing system to another computing system. For example, a migration may be performed for scheduled maintenance, resource balancing (e.g., a computing system 120 may not have enough resources for workload(s)), preventative failure management (e.g., a computing system 120 may detect an upcoming failure that will prevent it from executing workload(s)), and other reasons.

The migration component 104 within the computing system 106 is generally configured to perform migrations of logical partitions. For example, to perform a migration, the migration component 104 may determine a state of the logical partition on the first computing system. Such state information may include applicable memory (e.g., including applications), processor/register state information, connection information regarding physical storage allocated to the logical partition, etc. Once determined, the migration component 104 may create a logical partition on the target computing system. The creation of the logical partition on the target computing system may include creating a new logical partition on the target computing system or moving the existing logical partition to the target computing system.

Once created, the migration component 104 may transfer the state of the logical partition (e.g., memory, processor, clock and register state information, etc.) from the source computing system to the logical partition on the target computing system. The migration component 104 may transfer the state information such that the target logical partition continues to execute applications without interruption (e.g., transparent to the user). The migration component 104 may also transfer the connection information from the logical partition on the source computing system to the logical partition on the target computing system. As mentioned above, this connection information may include information regarding the mappings from the virtual resources of the logical partition to the physical resources (e.g., physical disks, etc.). Once transferred, the logical partition on the target computing system may use the virtual and/or physical resources to execute applications.

In these situations, the computing system 106 is generally configured to interact with the VIOS 126 on the source computing system in order to perform the migration, e.g., by retrieving the LPAR(s) 122 resource configuration information from the VIOS 126, using the information to configure the LPAR 122 on the target computing system, and removing the LPAR(s) 122 information from the source VIOS. As mentioned above, however, in situations where the VIOS 126 on the source computing system 120 is inactive, the computing system 106 cannot interact with the VIOS 126 in order to perform the migration.

However, embodiments presented herein present techniques that allow the computing system 106 to migrate logical partitions from a source computing system to another computing system, even when the VIOS 126 on the source computing system is inactive (and therefore the computing system 106 cannot communicate with the source VIOS 126). For example, the computing system 106 also includes a migration component 104, which generally represents logic (e.g., a software application, device firmware, an ASIC, etc.) that is configured to implement one or more of the techniques presented herein.

As described in more detail below, the migration component 104 is generally configured to retrieve (or collect) the LPAR(s) 122 resource configuration from the VIOS 126 of each computing system 120A-N every time the migration component 104 detects a change in the respective LPAR(s) 122 configuration. For example, the migration component 104 may trigger a data collection when virtual adapter(s) are first configured (e.g., upon startup of a LPAR 122), when virtual adapter(s) are added and/or removed, when storage devices are added and/or removed, etc. Once collected, the migration component 104 stores the collected information. Such information may be stored in the computing system 106 (e.g., persistent storage or non-volatile memory) or in another location (e.g., such as a database) separate from the computing system 106.

In some embodiments, even if the migration component 104 does not detect a configuration change, the migration component 104 can still trigger a data collection if the migration component 104 determines the collected information is out of date. For example, as described in more detail below, the migration component 104 can provide a status indicator (e.g., such as valid, stale, etc.) for the collected information and/or a timestamp that indicates when the information was collected. The migration component can trigger a data collection to update the resource configuration information if it determines (e.g., based on the status indicator and/or timestamp) that the collected information is stale (or out of date). In some embodiments, once the source VIOS is activated, the migration component 104 is configured to remove the resource configuration associated with the removed LPAR from the source VIOS (e.g., to prevent corruption and/or exposure of data) to unauthorized LPARs.

Note FIG. 1 illustrates merely one example of a computing environment 100 in which the techniques presented herein may be applied. More generally, one of ordinary skill in the art will recognize that the techniques presented herein may also be suited for other embodiments of computing environments.

Figure 2:
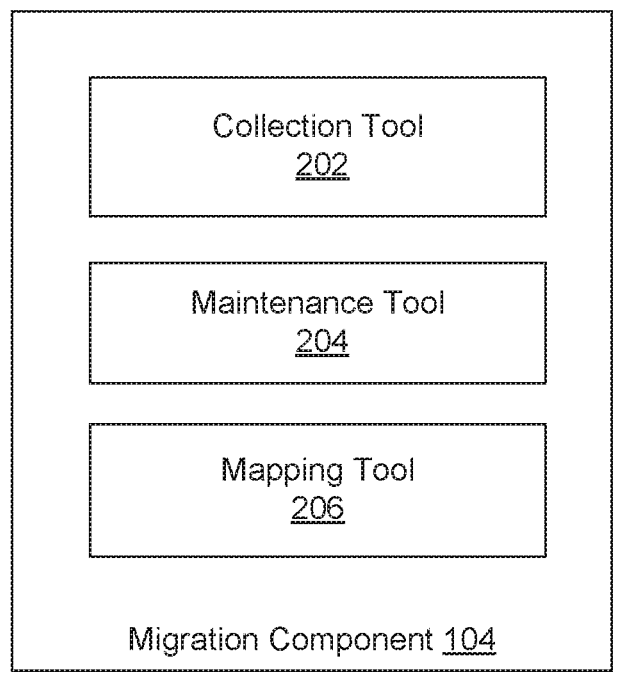
FIG. 2 illustrates an example of a migration component, according to one embodiment.

FIG. 2 further illustrates an example of the migration component 104, described relative to FIG. 1, according to one embodiment. As shown, the migration component 104 includes collection tool 202, maintenance tool 204, and mapping tool 206.

In one embodiment, the migration component 104 uses the collection tool 202 to retrieve the LPAR(s) resource configuration information in a given computing system from the VIOS in the respective computing system. For example, as mentioned above, the VIOS in a given computing system 120 generally includes mapping information that specifies the relationship between the virtual resources assigned to the LPAR(s) and the physical resources. In one embodiment, the collection tool 202 is configured to retrieve the configuration information any time the collection tool 202 detects a change in the resource configuration. For example, in one case, the collection tool 202 can trigger a data collection once LPAR(s) are powered on and adapter(s) are allocated to the LPAR(s). The collection tool 202 can detect when virtual adapter(s) are added and/or removed via the management component 102, and trigger a data collection. In one example, the collection tool 202 can trigger a data collection once it detects an attachment and/or removal of a storage device. In cases, where storage devices are attached and/or removed via the VIOS directly (e.g., without going through the management component 102), the collection tool 202 can monitor the events on the VIOS and trigger a data collection if it detects a change in storage. Once the collection tool 202 retrieves the resource configuration, the collection tool 202 is configured to store the information (e.g., in the computing system 106 or in a location separate from computing system 106). In one embodiment, the collection tool 202 can provide a status indicator (e.g., to indicate whether the information is valid, stale, etc.) and/or a timestamp (e.g., to indicate when the data was collected) for the retrieved information.

In one embodiment, the maintenance tool is generally configured to monitor the status of the collected information and determine whether to trigger a data collection in order to update the collected information for an LPAR. For example, the maintenance tool 204 can check the status of the collected information (e.g., using the status indicator and/or timestamp) and trigger a data collection if the collection information is out of date. In one case, if the status indicator indicates the information is stale or if the maintenance tool 204 determines (based on the timestamp) that the elapsed time since the information was collected is greater than a threshold, the maintenance tool 204 may determine to trigger a data collection in order to update the resource configuration. Additionally, or alternatively, the maintenance tool 204 can notify a user (or administrator) to let the user or administrator determine when to trigger a data collection. Doing so in this manner allows the computing system 106 to maintain the validity of any information that has been collected in situations where the computing system 106 temporarily loses communication with the computing systems 120.

In one embodiment, the migration component 104 is configured to use the mapping tool 206 to remove resource configuration information related to the LPAR(s) migrating from the source computing system. For example, in some embodiments, the mapping tool 206 is configured to remove adapter(s) definitions for the LPAR from the hypervisor on the source computing system during the migration of the LPAR from the source computing system to the target computing system. Doing so may prevent the allocation of the migrating LPAR's virtual adapter(s) to other LPARs in the source computing system.

In some cases, even though the LPAR's virtual adapter(s) may be removed from the hypervisor during the migration when the source VIOS is inactive, it may not be possible for the mapping tool 206 to remove the virtual adapter(s) mapping information from the source VIOS since the VIOS is inactive. Put differently, the source VIOS may still contain the removed LPAR(s) stale adapter definitions. In these cases, once the source VIOS is powered on again, if the mapping information is not removed, the storage/disk associated with the removed LPAR could be exposed to another LPAR in the source computing system, which could cause unwanted results.

As such, in one embodiment, the mapping tool 206 is also configured to remove the adapter definitions associated with the removed LPAR from the source VIOS once the source VIOS is activated. In one case, the mapping tool 206 removes the adapter definitions before a new adapter is configured in the same slot in which the hosting adapter for the migrated LPAR was present (e.g., using the same slot identifier). Doing so in this manner may prevent the exposure and/or corruption of the migrated LPAR's data and facilitate the migration of the LPAR back to the source computing system.

Figure 3A:
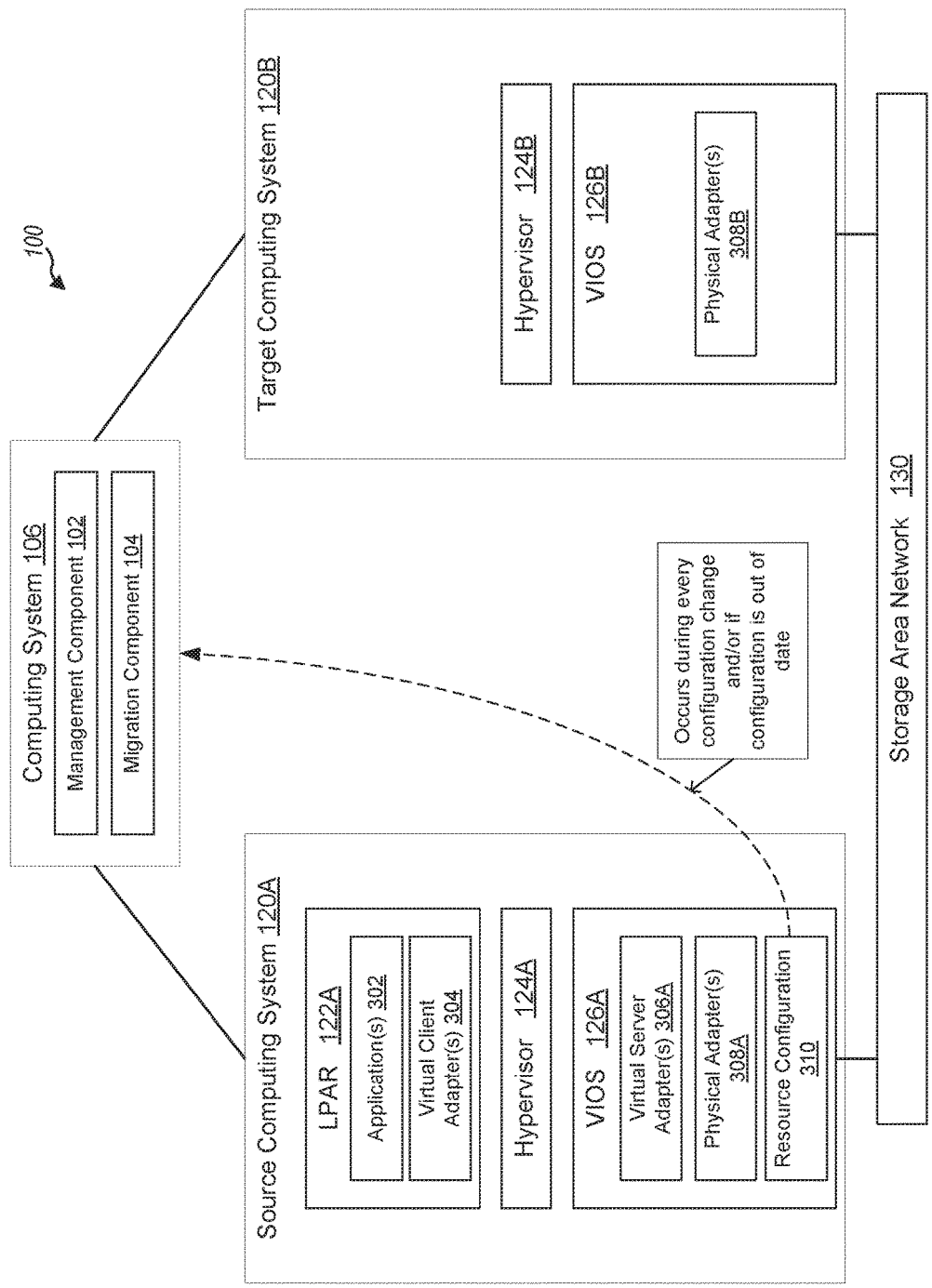
FIGS. 3A-3C illustrate an example migration of a logical partition from a source computing system with an inactive IO hosting server to another target computing system, according to one embodiment.
Figure 3B:
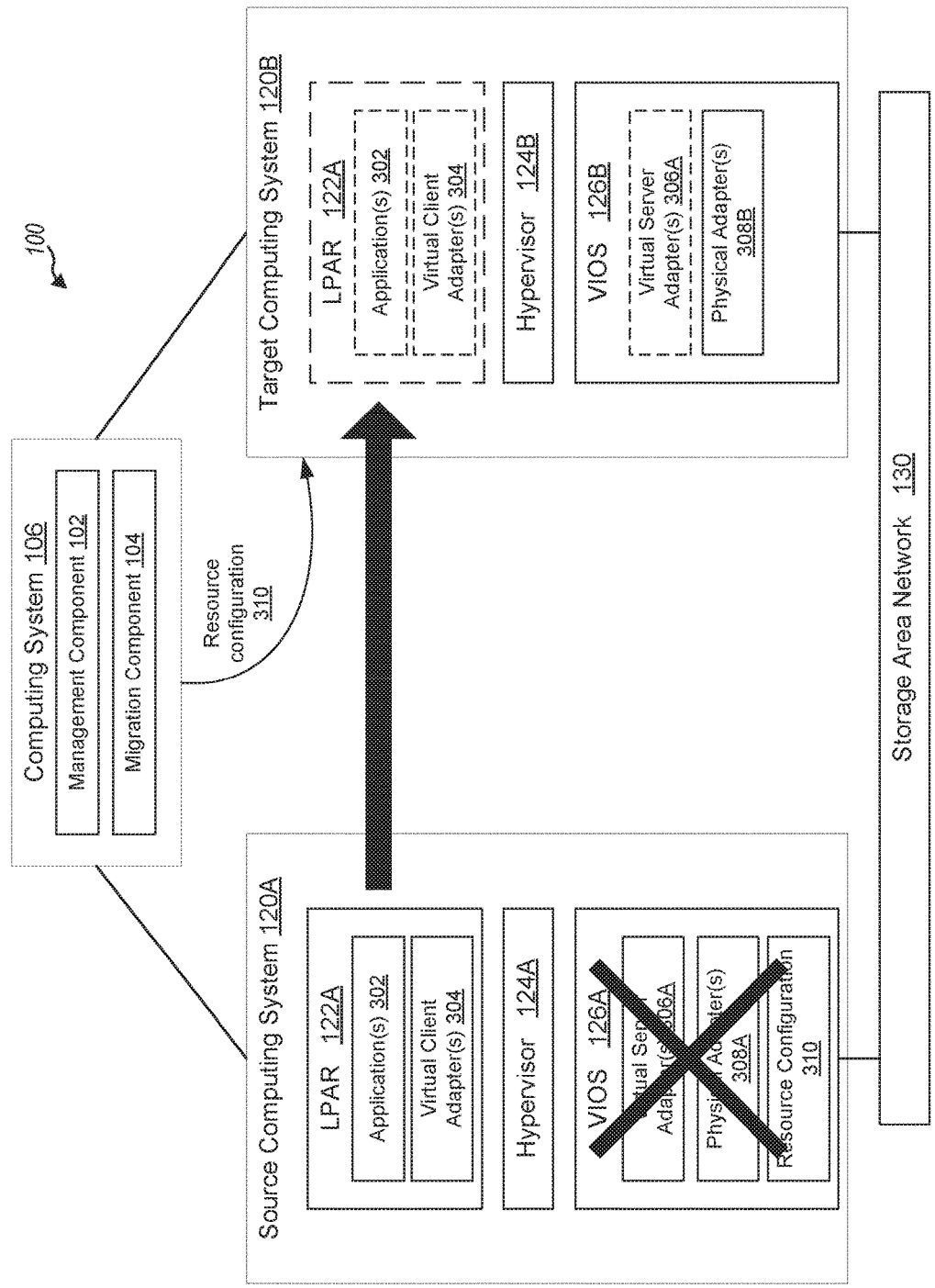
Figure 3C:
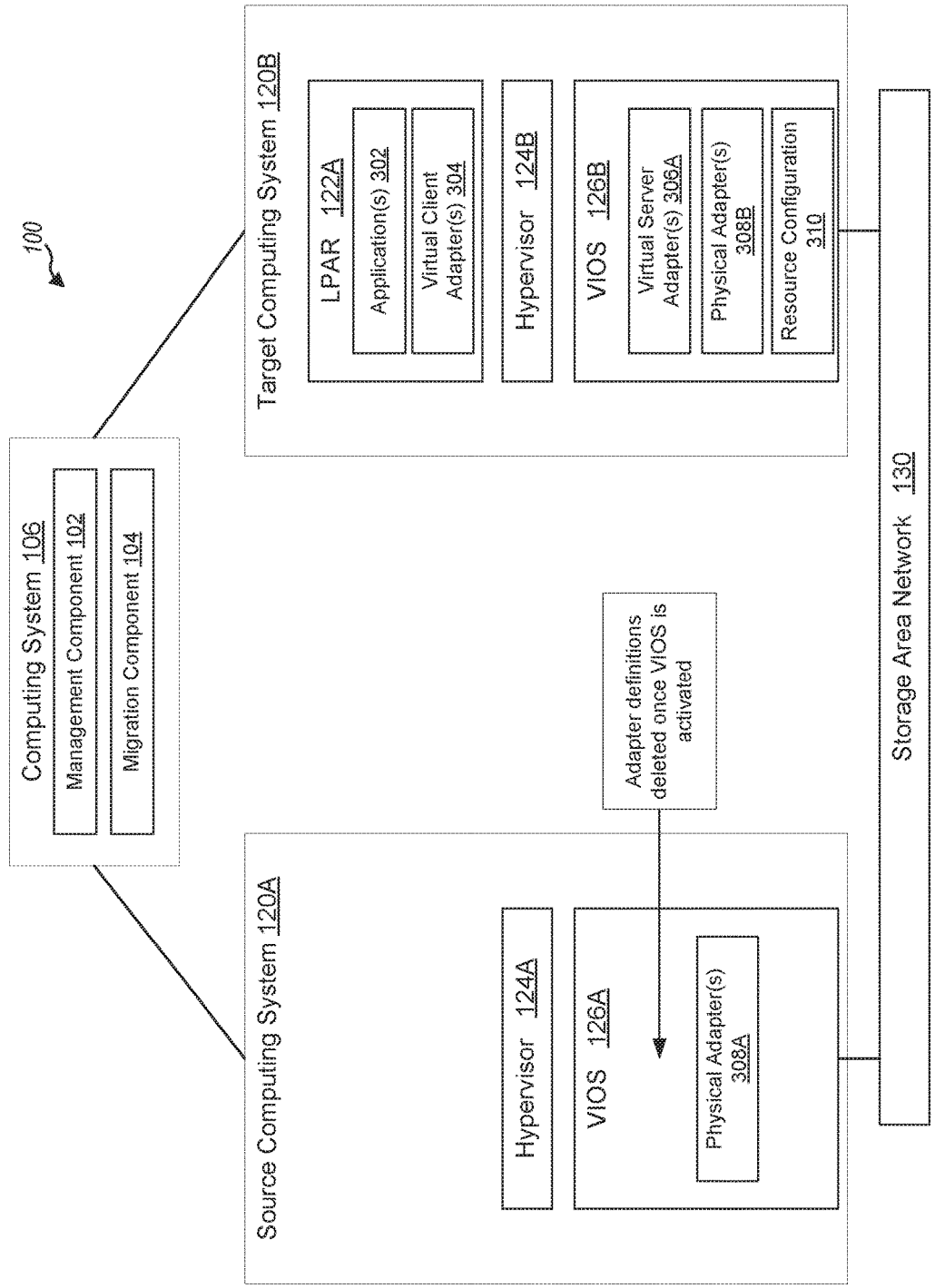

FIGS. 3A-3C illustrate a reference example of a migration process in the computing environment 100 using the techniques presented herein. In particular, FIGS. 3A-3C illustrate the migration of a LPAR 122A on a source computing system 120A with an inactive VIOS 126A to a target computing system 120B.

Referring first to FIG. 3A, the computing system 106 is configured to manage a source computing system 120A and a target computing system 120B. The source computing system 120A includes a LPAR 122, a hypervisor 124A, and a VIOS 126A. The LPAR 122A includes application(s) 302 and virtual client adapter(s) 304. The VIOS 126A includes virtual server adapter(s) 306A, physical adapter(s) 308A and resource configuration 310. The VIOS 126A allows the LPAR 122A to connect to physical resources, such as the physical adapter(s) and physical storage on the SAN 130 via virtual client adapter(s) 304 and virtual server adapter(s) 306A. The management component 102 may configure the virtual client adapter(s) 304 and the virtual server adapter(s) 306A.

In this embodiment, the VIOS 126A may initially be active. While active, the computing system 106 uses the migration component 104 to retrieve (or collect) resource configuration 310 from the VIOS 126A. The resource configuration 310 describes the mapping among the virtual client adapter(s) 304, virtual server adapter(s) 306A, physical adapter(s) 308A and the storage on the SAN 130. As mentioned above, the migration component 104 can retrieve the resource configuration 310 once it detects a change in the resource configuration of virtual and/or physical resources (e.g., due to addition/removal of virtual adapters, addition/removal of storage devices, etc.). Once collected, the migration component 104 stores the resource configuration 310 in the computing system 106. In one embodiment, the migration component 104 can also retrieve the resource configuration 310 if it determines the status of the collected information is out of date (e.g., based on a timestamp).

In some cases, the LPAR 122A (including its applications 302) may have to move from the source computing system 120A to the target computing system 120B. Referring to FIG. 3B, during a migration, the migration component 104 may detect that the source VIOS 126A is inactive. Once detected, the migration component 104 uses the stored resource configuration 310 (in the computing system 106) to configure the LPAR 122A on the target computing system 120B. For example, as shown, the migration component 104 uses the resource configuration 310 to map interaction between the virtual client adapter(s) 304, virtual server adapter(s) 306A, physical adapter(s) 308B, storage devices on SAN 130, etc. on the target computing system 120B. During the migration, the migration component 104 removes virtual adapter definitions from the hypervisor 124A. However, as shown, because the VIOS 126A is inactive, the migration component 104 may not be able to remove server adapter definitions from the VIOS 126A.

As shown in FIG. 3C, once the migration process is completed, the migration component 104 may determine that the source VIOS 126A is activated. Once detected, the migration component 104 removes the remaining resource configuration information from the VIOS 126A to prevent corruption and/or exposure of LPAR 122A's data to other LPARs that may be hosted on source computing system 120A.

Note that FIGS. 3A-3C illustrate merely one reference example of a migration process that may occur in a computing environment in which the VIOS is inactive on the source computing system. For example, although the migration of one LPAR was described, the techniques presented herein could also apply to the migration of multiple LPARs. More generally, one of ordinary skill in the art will recognize that the techniques presented herein may be adapted to many different other types of computing environments.

Figure 4:
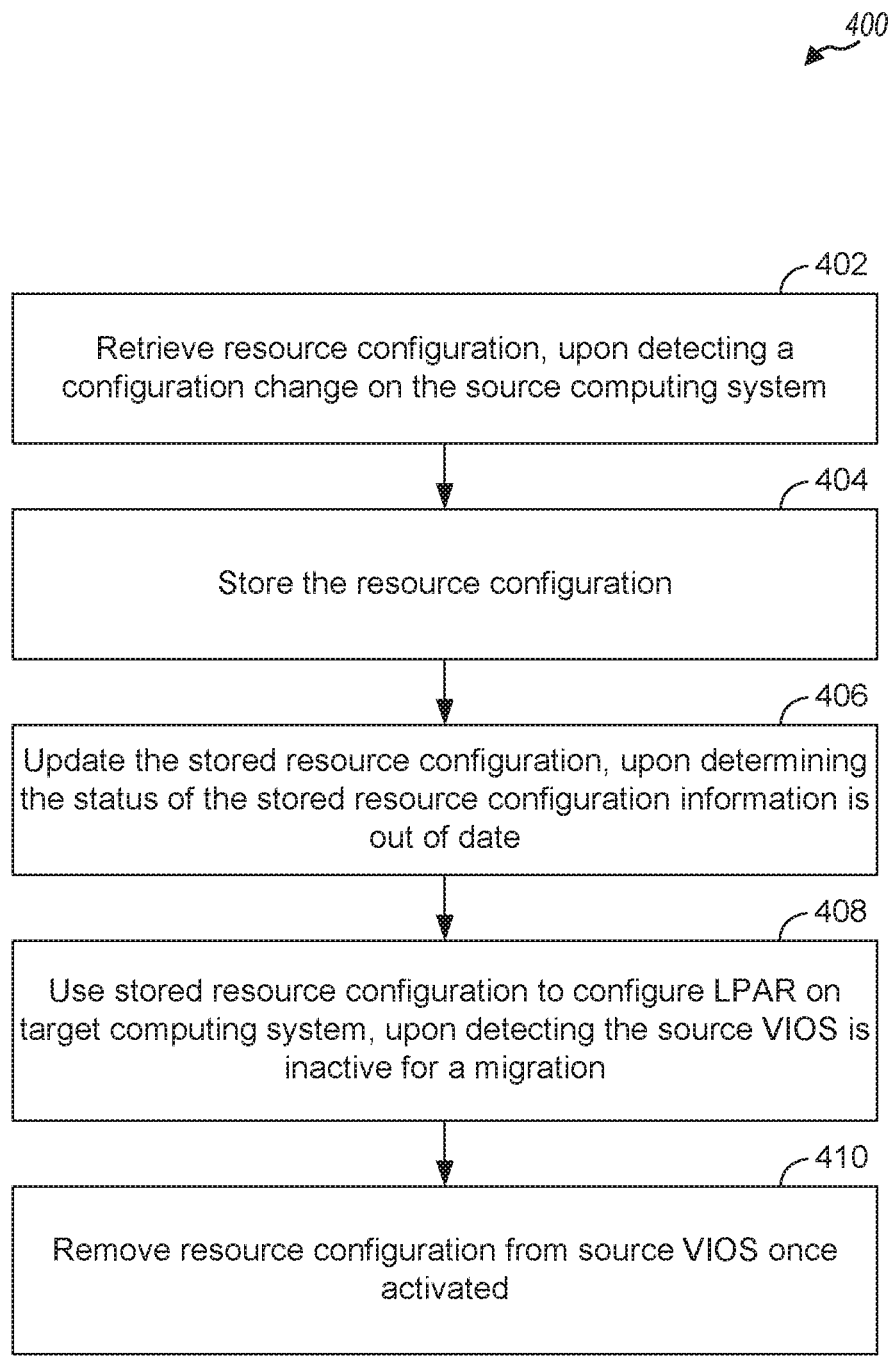
FIG. 4 illustrates a method for performing a migration of a logical partition, according to one embodiment.

FIG. 4 illustrates a method 400 for migrating a logical partition from one source computing system to another target computing system, according to one embodiment. As shown, the method 400 begins at block 402, where the migration component 104 retrieves resource configuration of a logical partition from a source computing system upon detecting a change in the resource configuration. At block 404, the migration component 104 stores the resource configuration in (or separate from) the computing system 106. At block 406, upon detecting that the status of the stored resource configuration is out of date, the migration component 104 updates the stored resource configuration (e.g., by triggering another data retrieval). At block 408, upon detecting that the VIOS on a source computing system is inactive for migrating a logical partition, the migration component 104 uses the stored resource configuration to configure the logical partition on the target computing system. At block 410, the migration component removes the resource configuration from the source VIOS once the migration component 104 detects the source VIOS is activated.

Figure 5:
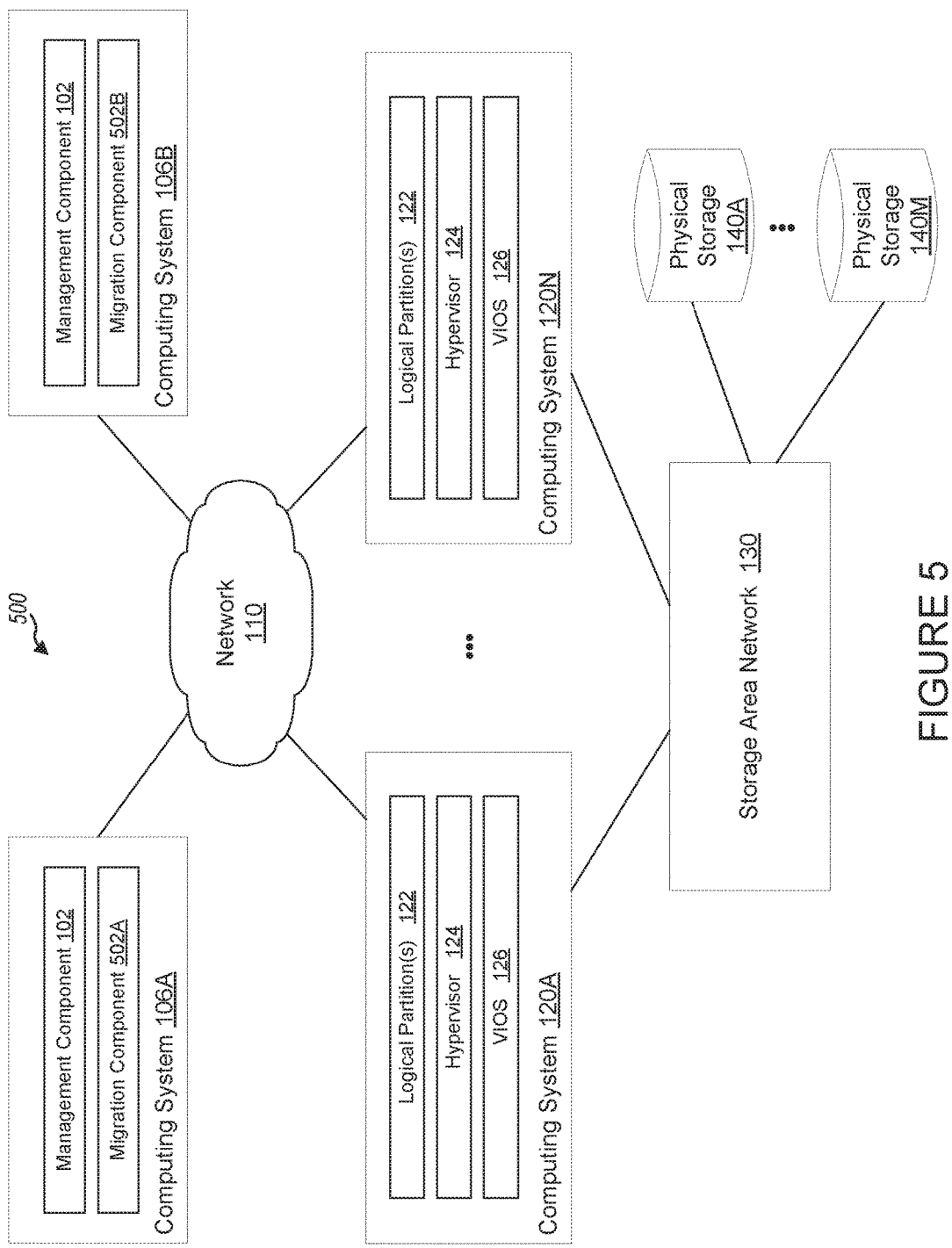
FIG. 5 illustrates another example computing environment in which logical partition(s) may migrate from one computing system with an inactive IO hosting server to another computing system, according to one embodiment.

FIG. 5 illustrates another example computing environment 500, in which the techniques presented herein may be practiced, according to one embodiment. Note that many of the components illustrated in the computing environment 500 have same or similar functions as their corresponding components described relative to FIG. 1. Therefore, for the sake of convenience, these functions (where the same) may not be described again below in the description.

Compared to the computing environment 100, the computing environment 500 includes two computing systems (or management consoles) 106A-B that are responsible for managing the computing systems 120A-120N. In this embodiment, each migration component 502A-B is configured to retrieve resource configuration of LPARs 122 on the computing systems 120A-120N each time the configuration is changed. Put differently, each migration component 502A-B persists its own copy of the resource configuration for each LPAR.

In some embodiments, if a user (or administrator) uses one management console (e.g., computing system 106A) to make a change to the resource configuration in one computing system (e.g., computing system 120A), the migration component 502A is also configured to indicate to the migration component 502B (in the computing system 106B) that a change in the configuration on the computing system 120A has occurred. Once received, the migration component 502B can trigger a data retrieval to update its own local copy of the computing system 120A's configuration. Doing so in this manner adds extra redundancy, such that migration procedures can be performed in the event one computing system 106 has a problem and crashes.

Figure 6:
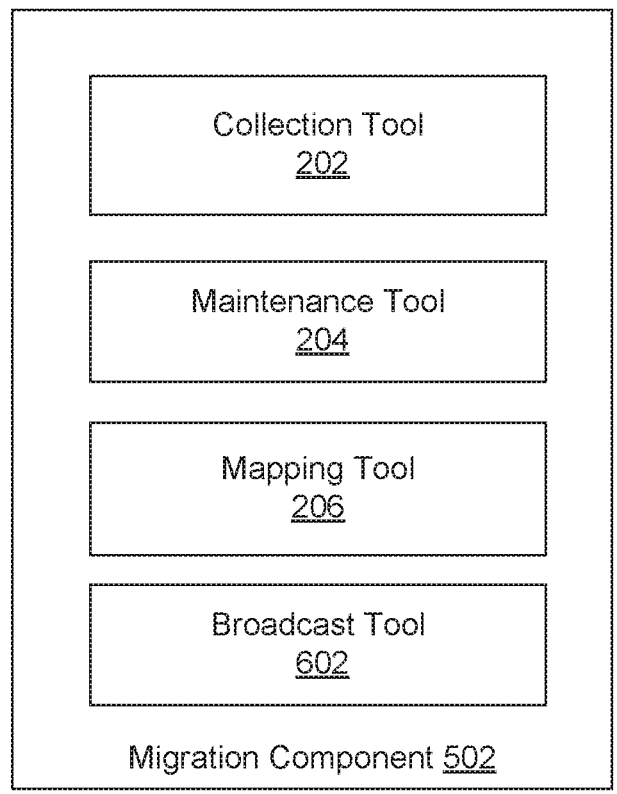
FIG. 6 illustrates another example of a migration component, according to one embodiment.

FIG. 6 further illustrates an example of the migration component 502, described relative to FIG. 5, according to one embodiment. Note that many of the components (e.g., collection tool 202, maintenance tool 204, and mapping tool 206) of the migration component 502 have same or similar functions as their corresponding components described relative to FIG. 2. Therefore, for the sake of convenience, these functions (where the same) may not be described again below in the description.

As shown, compared to the embodiment of the migration component depicted in FIG. 2, the migration component 502 includes a broadcast tool 602 (e.g., in addition to the collection tool 202, maintenance tool 204, and mapping tool 206). As mentioned above, in cases, where a configuration in the resources of one computing system 120 occurs via a first migration component (but not another second migration component), the first migration component can indicate that a configuration change has occurred via the broadcast tool 602. In some cases, the broadcast tool 602 can send solely the indication (e.g., without the resource configuration information) that a configuration change occurred to the second migration component. In some cases, the broadcast tool 602 can send the resource configuration information along with the indication to the second migration component. Once the second migration component receives the indication and/or the data, the second migration component can either trigger another data retrieval and/or use the indicated data to update its local copy of the resource configuration information.

Figure 7:
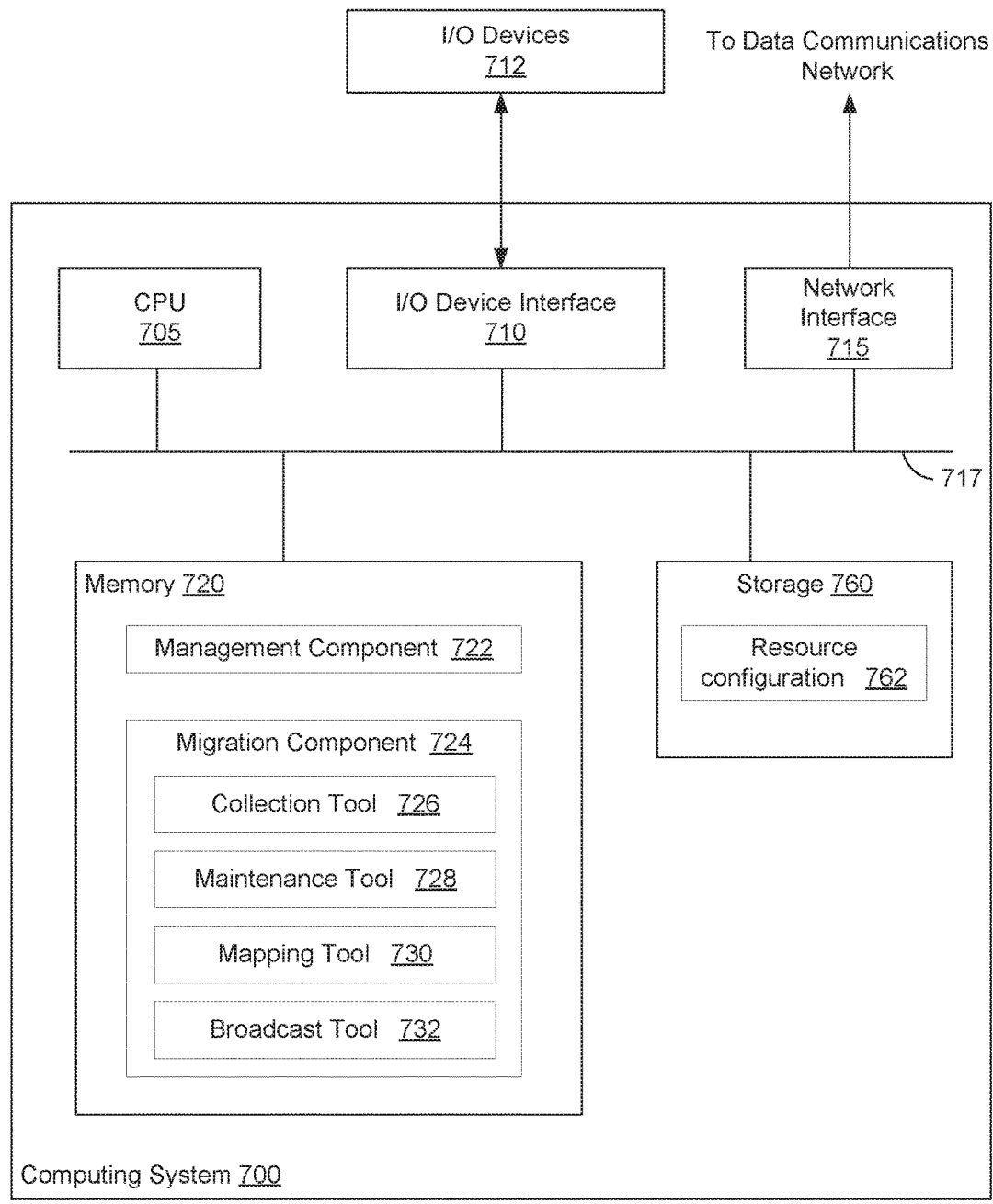
FIG. 7 illustrates a block diagram of a computing system configured to migrate a logical partition, according to one embodiment.

FIG. 7 illustrates a computing system 700 configured to migrate a logical partition from one computing system that has an inactive I/O hosting server to another computing system, according to one embodiment. The computing system 700 may be an example of a management console, such as a HMC. As shown, the computing system 700 includes, without limitation, a central processing unit (CPU) 705, a network interface 715, a memory 720, and storage 760, each connected to a bus 717. The computing system 700 may also include an I/O device interface 710 connecting I/O devices 712 (e.g., keyboard, mouse, and display devices) to the computing system 700. Further, in context of this disclosure, the computing elements shown in the computing system 700 may correspond to a physical computing system (e.g., a system in a data center) or may be a virtual computing instance executing within a computing cloud.

The CPU 705 retrieves and executes programming instructions stored in the memory 720 as well as stores and retrieves application data residing in the memory 720. The interconnect 717 is used to transmit programming instructions and application data between CPU 705, I/O devices interface 710, storage 760, network interface 715, and memory 720. Note CPU 705 is included to be representative of a single CPU, multiple CPUs, a single CPU having multiple processing cores, and the like. Memory 720 is generally included to be representative of a random access memory. The storage 760 may be a disk drive storage device. Although shown as a single unit, storage 760 may be a combination of fixed and/or removable storage devices, such as fixed disc drives, removable memory cards, or optical storage, network attached storage (NAS), or a storage area-network (SAN). The storage 760 includes resource configuration information 762.

Illustratively, the memory 720 includes a management component 722 and a migration component 724. As mentioned above, the management component 722 is generally configured to manage the resources on computing systems 120. The migration component 724 includes a collection tool 726, a maintenance tool 728, a mapping tool 730, and a broadcast tool 732. The migration component 724 uses the collection tool 726 to retrieve resource configuration data of LPARs (e.g., upon detecting a change in configuration and/or determining that the information is stale). The migration component 724 uses the maintenance tool 728 to monitor the status of the collected information. The migration component 724 uses the mapping tool to delete adapter definitions (e.g., from the hypervisor or VIOS once active) that may belong to the migrated LPAR. The migration component 724 uses the broadcast tool to indicate to other computing systems that a configuration change has occurred and that the other computing system should update its local copy of the resource configuration.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

While the foregoing is directed to embodiments of the present disclosure, other and further embodiments of the invention may be devised without departing from the basic scope thereof, and the scope thereof is determined by the claims that follow.

What is claimed is:

1. A method for performing a migration of a logical partition, comprising:
   upon detecting a change in a resource configuration of a logical partition on a first computing system, collecting the resource configuration of the logical partition, wherein the resource configuration comprises information related to one or more virtual resources allocated to the logical partition;
   upon detecting that an input/output (I/O) server on the first computing system is inactive for the migration of the logical partition, using the collected resource configuration to configure the logical partition on a second computing system;
   clearing the resource configuration of the logical partition from a hypervisor in the first computing system; and
   after performing the migration of the logical partition to the second computing system, clearing the resource configuration of the logical partition from the I/O server on the first computing system, upon determining that the I/O server is active, wherein performing the migration comprises:
      determining a state of the logical partition on the first computing system;
      creating a logical partition on the second computing system;
      transferring the resource configuration of the logical partition on the first computing system to the logical partition on the second computing system; and
      transferring the state of the logical partition on the first computing system to the second computing system.

2. The method of claim 1, wherein the change in the resource configuration comprises at least one of a change in a number of virtual adapters allocated to the logical partition or a change in a number of storage devices used by the logical partition.

3. The method of claim 1, further comprising:
   upon determining that the collected resource configuration is not valid, updating the collected resource configuration.

4. The method of claim 3, further comprising:
   providing at least one of a status or timestamp for the collected resource configuration, wherein the status indicates whether the collected resource configuration is out of date, wherein the timestamp indicates a time the resource configuration was collected, and wherein determining that the resource configuration is not valid comprises determining that an amount of time that has elapsed since the time indicated by the timestamp is greater than a threshold.

5. The method of claim 3, wherein updating the collected resource configuration comprises triggering another collection of the resource configuration of the logical partition.

6. The method of claim 1, further comprising indicating the change in the resource configuration of the logical partition to at least one device.

7. A system, comprising:
a processor; and
a memory storing program code, which, when executed on the processor, performs an operation for performing a migration of a logical partition, the operation comprising:
  upon detecting a change in a resource configuration of a logical partition on a first computing system, collecting the resource configuration of the logical partition, wherein the resource configuration comprises information related to one or more virtual resources allocated to the logical partition;
  upon detecting that an input/output (I/O) server on the first computing system is inactive for the migration of the logical partition, using the collected resource configuration to configure the logical partition on a second computing system;
  clearing the resource configuration of the logical partition from a hypervisor in the first computing system; and
  after performing the migration of the logical partition to the second computing system, clearing the resource configuration of the logical partition from the I/O server on the first computing system, upon determining that the I/O server is active, wherein performing the migration comprises:
    determining a state of the logical partition on the first computing system;
    creating a logical partition on the second computing system;
    transferring the resource configuration of the logical partition on the first computing system to the logical partition on the second computing system; and
    transferring the state of the logical partition on the first computing system to the second computing system.

8. The system of claim 7, wherein the change in the resource configuration comprises at least one of a change in a number of virtual adapters allocated to the logical partition or a change in a number of storage devices used by the logical partition.

9. The system of claim 7, wherein the operation further comprises:
  upon determining that the collected resource configuration is not valid, updating the collected resource configuration.

10. The system of claim 9, wherein the operation further comprises:
  providing at least one of a status or timestamp for the collected resource configuration, wherein the status indicates whether the collected resource configuration is out of date, wherein the timestamp indicates a time the resource configuration was collected, and wherein determining that the resource configuration is not valid comprises determining that an amount of time that has elapsed since the time indicated by the timestamp is greater than a threshold.

11. The system of claim 9, wherein updating the collected resource configuration comprises triggering another collection of the resource configuration of the logical partition.

12. A computer program product, comprising:
a non-transitory computer-readable storage medium having computer-readable program code embodied therewith, the computer-readable program code executable by one or more computer processors to perform an operation for performing a migration of a logical partition, the operation comprising:
  upon detecting a change in a resource configuration of a logical partition on a first computing system, collecting the resource configuration of the logical partition, wherein the resource configuration comprises information related to one or more virtual resources allocated to the logical partition;
  upon detecting that an input/output (I/O) server on the first computing system is inactive for the migration of the logical partition, using the collected resource configuration to configure the logical partition on a second computing system;
  clearing the resource configuration of the logical partition from a hypervisor in the first computing system; and
  after performing the migration of the logical partition to the second computing system, clearing the resource configuration of the logical partition from the I/O server on the first computing system, upon determining that the I/O server is active, wherein performing the migration comprises:
    determining a state of the logical partition on the first computing system;
    creating a logical partition on the second computing system;
    transferring the resource configuration of the logical partition on the first computing system to the logical partition on the second computing system; and
    transferring the state of the logical partition on the first computing system to the second computing system.

13. The computer program product of claim 12, the operation further comprises:
  upon determining that the collected resource configuration is not valid, updating the collected resource configuration, wherein updating the collected resource configuration comprises triggering another collection of the resource configuration of the logical partition.

* * * * *